June 22, 1954   E. C. MARCO ET AL   2,681,991
RADAR ANTENNA EQUIPMENT
Filed April 24, 1951   6 Sheets-Sheet 1

EARL C. MARCO
RICHARD J. BOARDMAN
INVENTORS

BY George R. Bliss

ATTORNEY.

June 22, 1954  E. C. MARCO ET AL  2,681,991
RADAR ANTENNA EQUIPMENT
Filed April 24, 1951  6 Sheets-Sheet 2

EARL C. MARCO
RICHARD J. BOARDMAN
INVENTORS

BY George R. Bliss

ATTORNEY.

June 22, 1954  E. C. MARCO ET AL  2,681,991
RADAR ANTENNA EQUIPMENT
Filed April 24, 1951  6 Sheets-Sheet 3

INVENTORS
EARL C. MARCO
RICHARD J. BOARDMAN
BY George R. Bliss
ATTORNEY.

June 22, 1954  E. C. MARCO ET AL  2,681,991
RADAR ANTENNA EQUIPMENT
Filed April 24, 1951  6 Sheets-Sheet 5
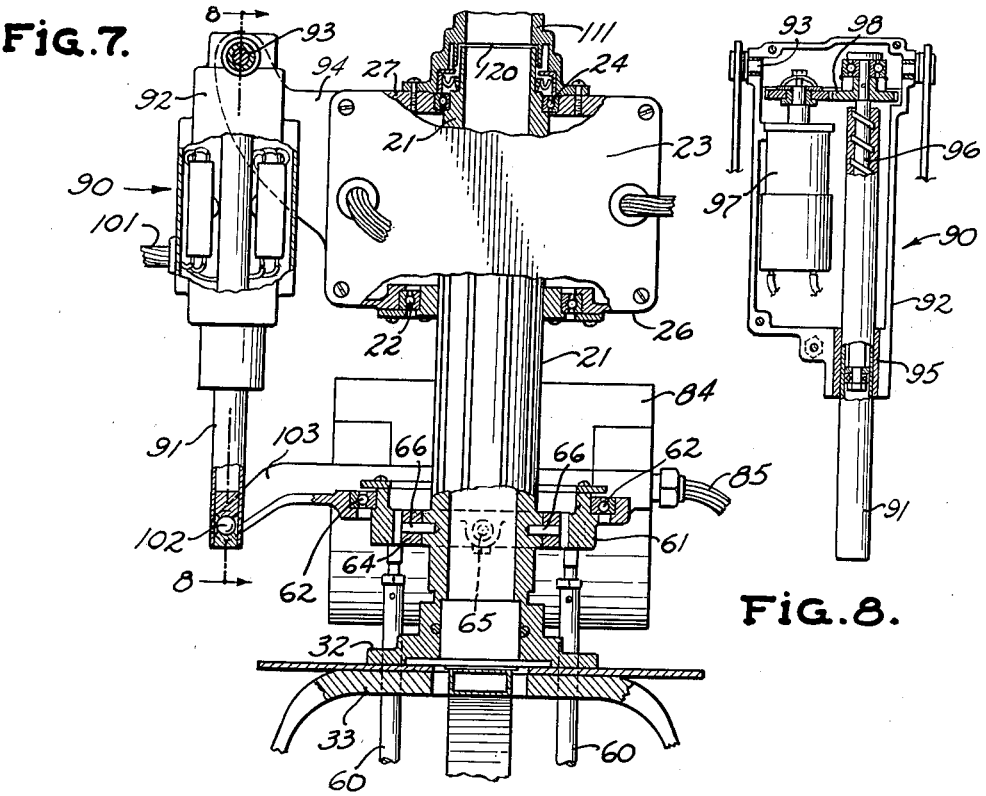
Fig. 7.
Fig. 8.
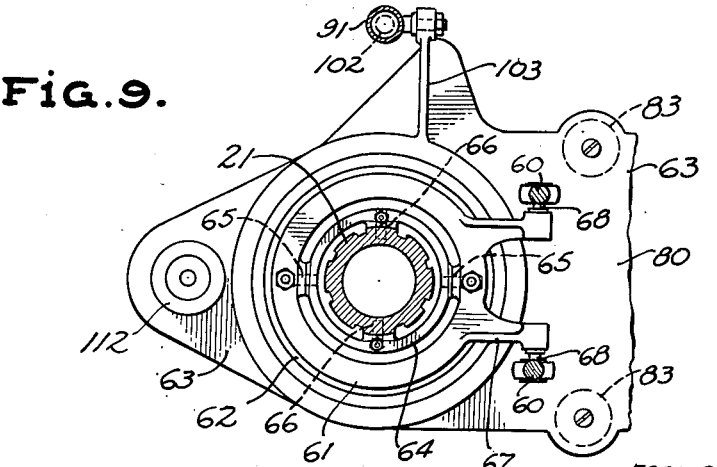
Fig. 9.
EARL C. MARCO
RICHARD J. BOARDMAN
INVENTORS
BY George R. Bliss
ATTORNEY.

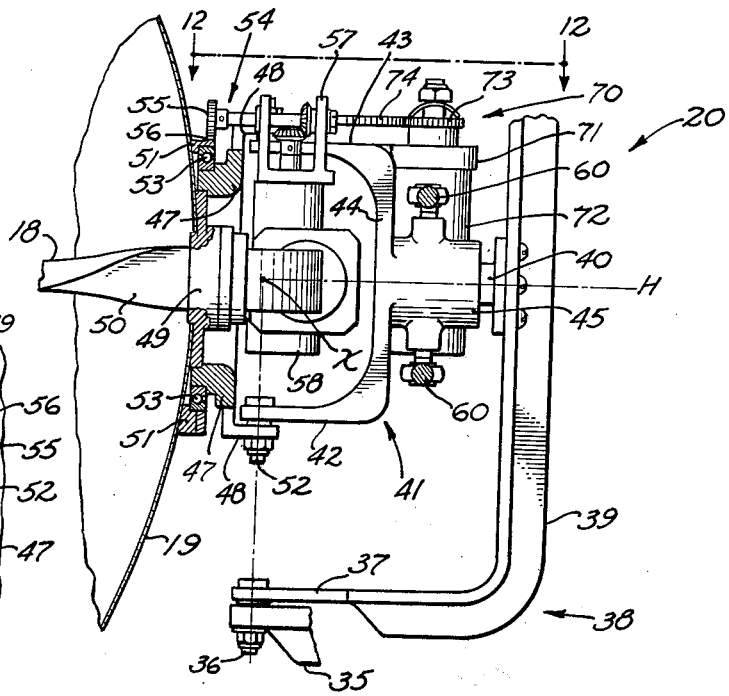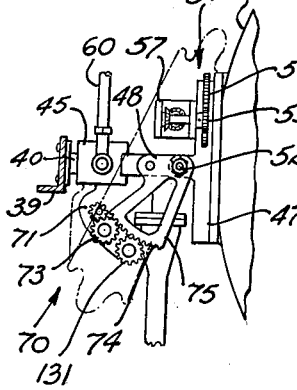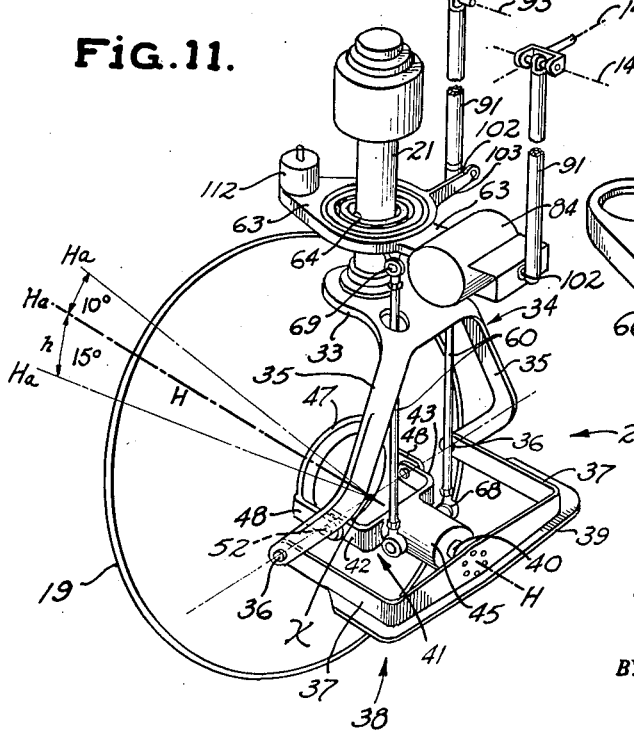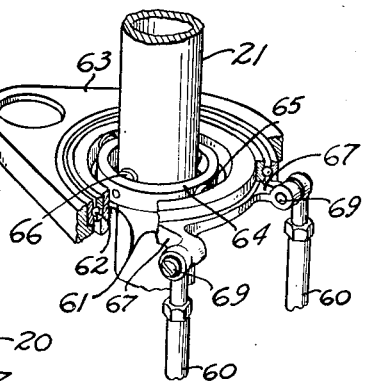

Patented June 22, 1954

2,681,991

UNITED STATES PATENT OFFICE 2,681,991

RADAR ANTENNA EQUIPMENT

Earl C. Marco and Richard J. Boardman, Los Angeles, Calif., assignors, by mesne assignments, to The Houston-Fearless Corporation, Los Angeles, Calif.

Application April 24, 1951, Serial No. 222,614

18 Claims. (Cl. 250—33.65)

This invention relates to a stabilizer for an antenna of radar equipment which is subject to bodily tilting movement relative to the earth under the conditions of use of the equipment. It is herewith shown and described as applied to a scanning radar set mounted on an aircraft.

The antenna of a scanning radar set is usually constructed to revolve over a complete azimuth circle of 360°, or, optionally, to oscillate over a limited azimuth angle, at a varying rate, which may be in the neighborhood of 40 revolutions or oscillations per minute.

Radar antenna stabilizers are used to maintain constant with reference to the plane of the horizon the angle of elevation of a beam-forming-and-directing means (i. e., the radiator and reflector) moving in azimuth, in correction of the effect of any tilting of the aircraft about its transverse or longitudinal axis or an axis positioned between these axes. It has no action corrective of the effect on the radar beam or on the scope picture, of vertical or horizontal movement of the aircraft as a whole or of a change of flight speed.

Because by the very nature of radar, objects appear on the scope at a constant radial distance from the center of the picture, an object will not, in the absence of a stabilizer, change its range position on the indicator scope picture due to tilting of the aircraft. Its representation on the scope will, however, change in brilliancy, depending upon the size of the angle of elevation between the beam and the direction of the object, and will fade entirely from the scope, as soon as all effective portions of the beam move completely above or below it. The representation on the scope picture will also, in the absence of stabilization, shift back and forth in azimuth as the aircraft rolls and pitches, if the target object is not in the vertical plane of the effective tilt axis or a vertical plane perpendicular thereto, due to the variation in the azimuth angle of the position of the object lying in intermediate vertical planes, when the angle is projected vertically upon a plane which is changing its angle and direction of tilt.

Stabilization of the antenna also maintains constant the polarity of the beam, sometimes a desirable condition. Thus an equal energy beam, vertically extended in cross section, which is used for wide vertical angle pickup of targets, as distinguished from a circular pencil beam, must be kept vertical for clarity of the scope picture. If the antenna is not stabilized horizontally the beam, in sectional configuration, will be inclined in different directions with respect to the ground level at different azimuth positions, as the antenna makes a revolution, or at a fixed azimuth position under the influence of the pitch and roll of the aircraft.

It is therefore necessary to stabilize the antenna, to keep the beam whether stationary on a target or revolving in azimuth, at a constant angle of elevation, and also, when conditions require it, to maintain the beam, whether stationary or revolving in azimuth, at a constant angular position of polarity about its axis, with reference to a horizontal plane.

One of the objects of this invention is the provision of a stabilizing arrangement in which the number and weight of the parts which move during the stabilizing operation shall be at a minimum, reducing the inertia lag.

Another object is the provision of a stabilizing arrangement which shall be simple and direct in its action without appreciable error from lost motion or operative lag.

Another object is the provision of a stabilizing arrangement which shall have motion transmitting connections between the beam forming and directing means and a terrestrially horizontally stationary, gyroscopically controlled member, of such a character that the radar beam maintains a truly constant angle of elevation to the horizon, and a constant angle of polarization with respect to its own axis.

It is another object of the invention to provide a means for stabilizing the antenna which has a minimum of structural parts in the path of the beam during extreme conditions.

It is yet another object of the invention to provide a stabilizing mechanism which is compact, of light weight, lends itself to ready assembly with the radar antenna and antenna operating mechanism, is relatively inexpensive to make and install on the antenna unit, and is readily accessible for adjustment and repair.

Other objects, and advantages will be apparent from the disclosure of one embodiment of the invention presented for illustrative purposes in the following description and accompanying drawings, the invention being defined in the appended claims.

In the drawings:

Figure 7 is a vertical sectional view taken as indicated by the line 7—7 of Figure 6;

Figure 8 is a vertical sectional view taken as indicated by the line 8—8 of Figure 7;

Figure 9 is a horizontal section taken as indicated by the line 9—9 of Figure 6;

Figure 10 is a horizontal section taken as indicated by the line 10—10 of Figure 6;

Figure 11 is a diagrammatic perspective view of the stabilizer;

Figure 12 is a reduced side elevation taken as indicated by the arrows 12—12 of Figure 10, and showing the two transmission mechanisms, for rotating the reflector and spoiler, and for changing the angle of elevation.

Figure 13 is an enlarged perspective view of the gimbal rings and associated parts shown in Figure 11.

Figure 1:
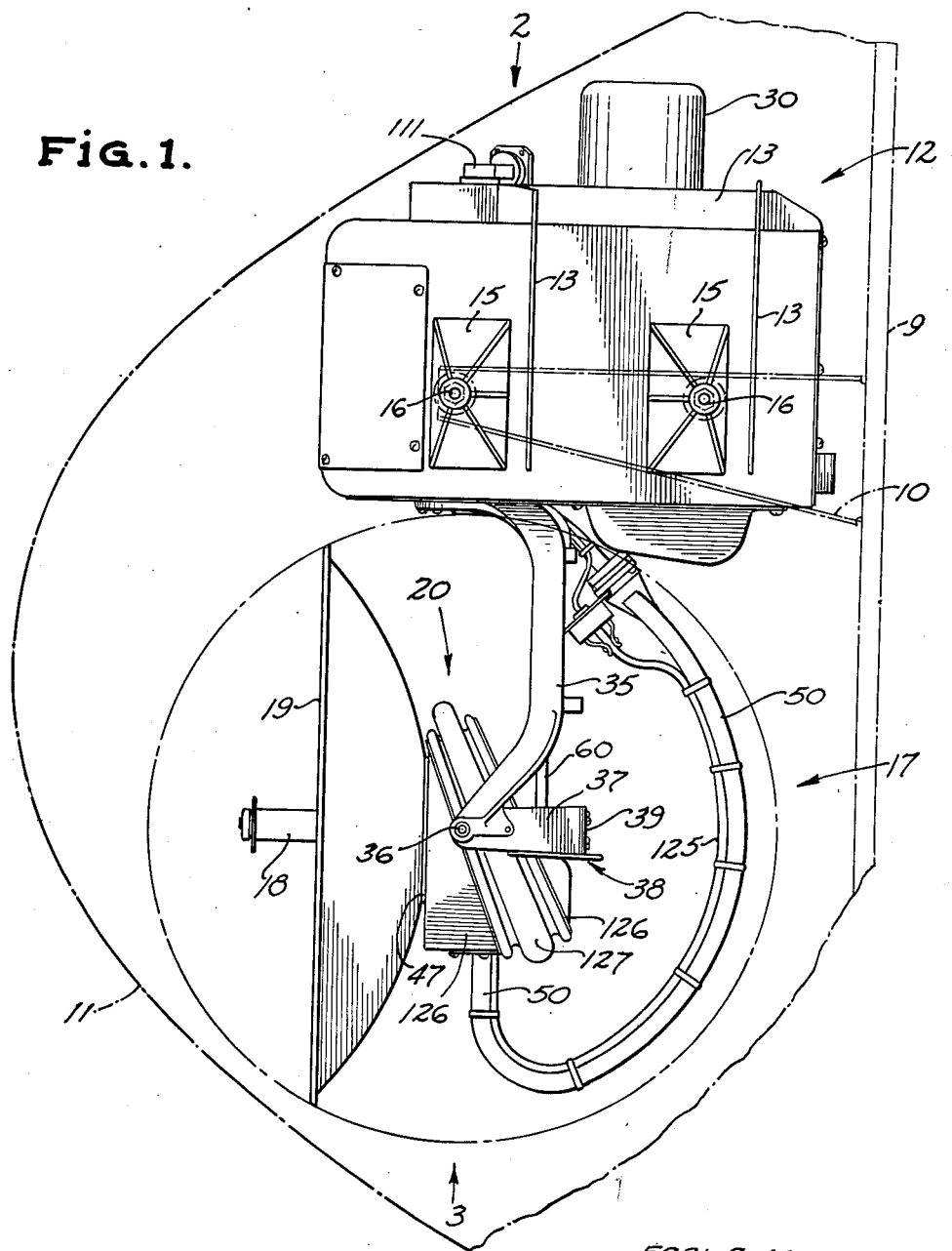
Figure 1 is a side elevation of the antenna, provided with a stabilizer of this invention.
Figure 2:
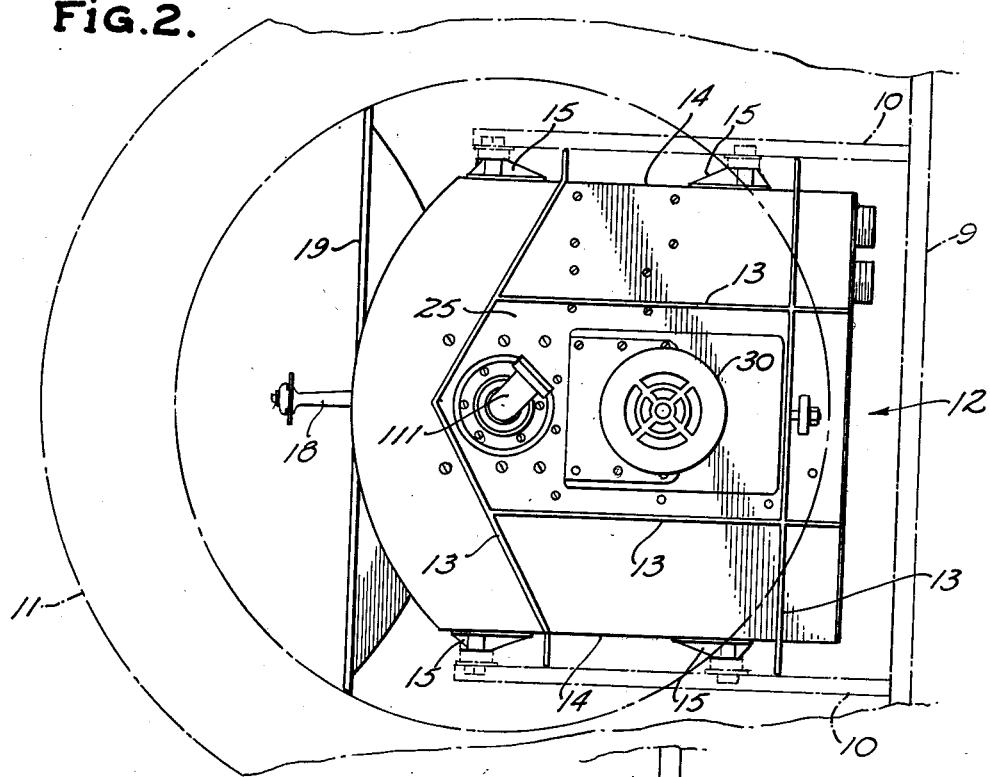
Figure 2 is a top plan as indicated by the arrow 2 of Figure 1.
Figure 3:
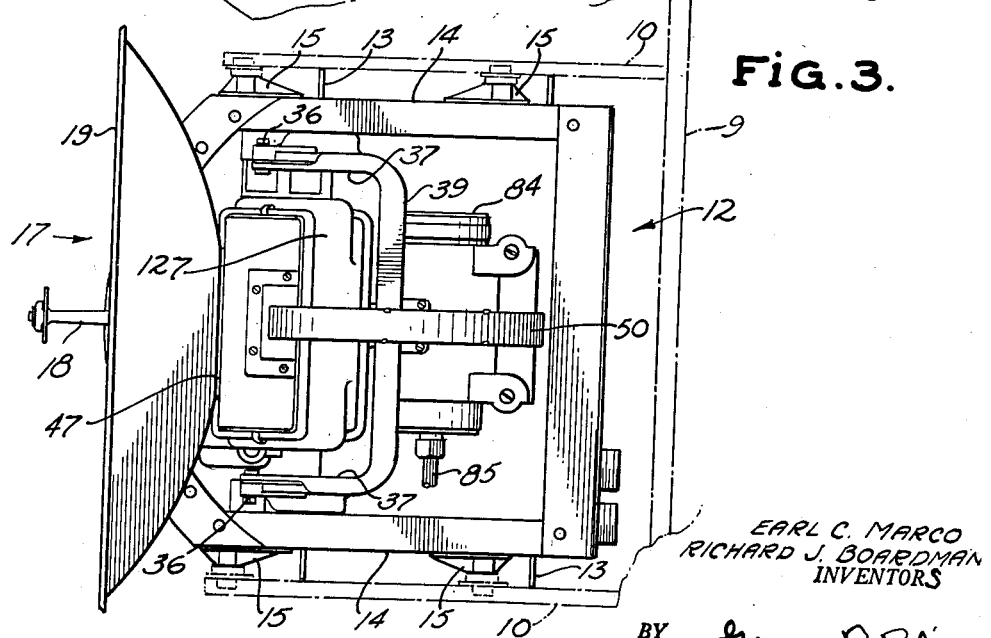
Figure 3 is a bottom plan view as indicated by the arrow 3 of Figure 1.
Figure 4:
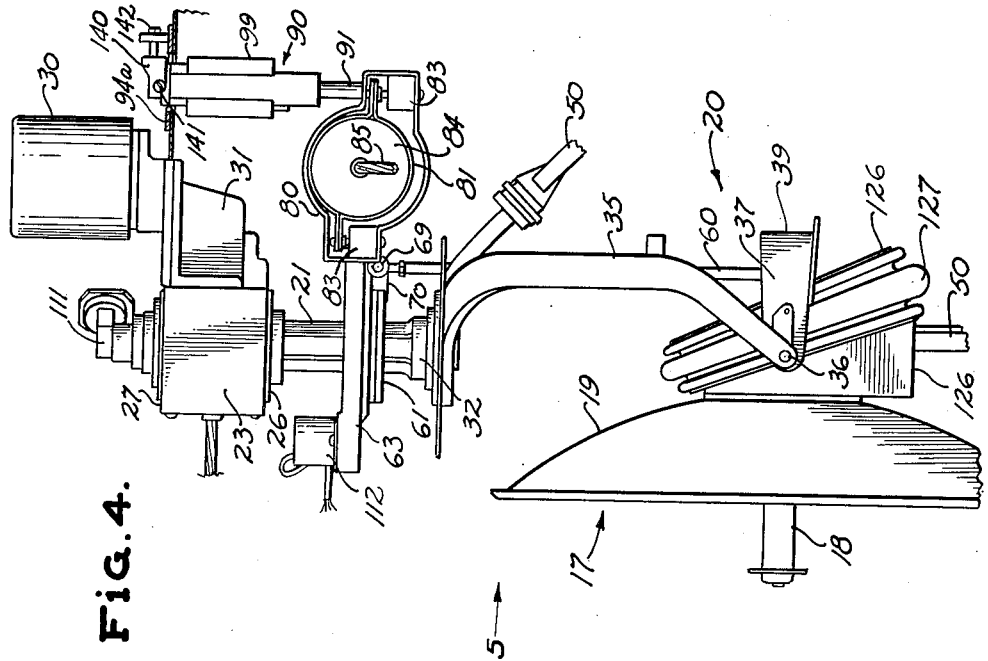
Figure 4 is a side elevation of the antenna and stabilizer with casing removed (similar to Figure 1)
Figure 5:
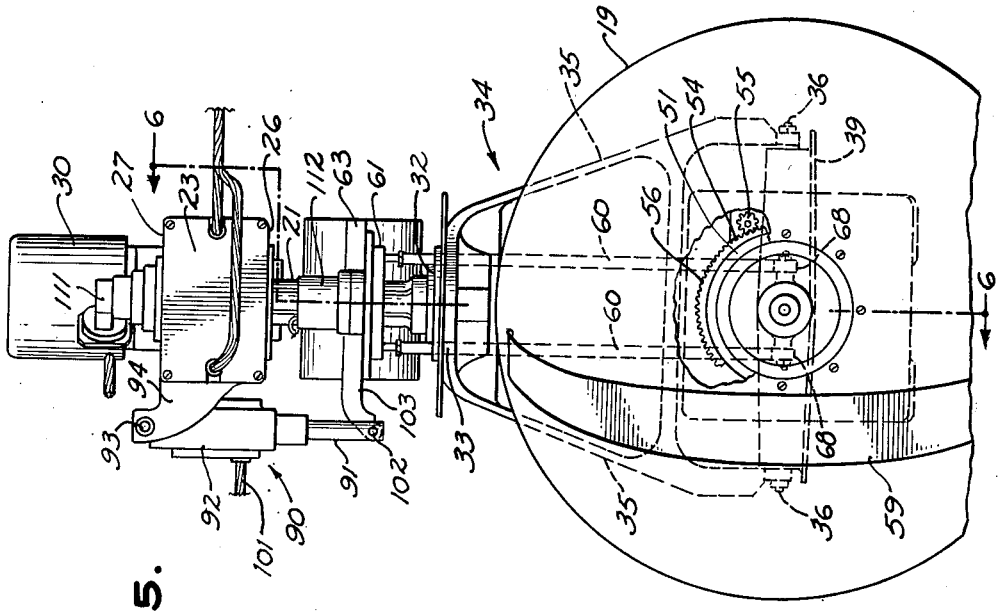
Figure 5 is a front elevation of the antenna and stabilizer with casing removed as indicated by the arrow 5 on Figure 4.

The antenna mechanism, as shown in Figures 1, 2 and 3 is mounted in a forward chamber of the aircraft, in a radome indicated schematically at 11. A hollow box-like frame 12, suitably reenforced by ribs 13, is stationarily mounted on the aircraft. Each of the side walls 14 of the frame 12 is formed with two thickened ribbed bosses 15 providing threaded bolt sockets 16 by which the frame is secured to supporting arms 10 which are stationarily supported on the aircraft frame structure, as on a bulkhead 9. From this frame 12, as will be presently set forth, is suspended to rotate on a vertical axis, the antenna proper.

The antenna proper 17, which may be termed the antenna head, comprises a standard radiator 18 and a parabolic reflector 19 and a carrying frame generally indicated by the numeral 20, the frame 20 being rigidly secured to the lower end of a tubular shaft 21, mounted in the frame casing 12 (Figures 4, 5, 6 and 7). This tubular shaft is supported on a lower ball bearing 22 carried by the lower wall 26 of a slip ring box 23, which mounts a slip ring structure to be described later, and an upper ball bearing 24, carried by the upper wall 27 of the slip ring box 23. The slip ring box is bolted to the top wall 25 of the casing 12.

A motor 30 and transmission 31 are mounted on the casing 12, and under the control of the operator drive the shaft 21 for azimuth rotation of the antenna head 17. For the oscillatory movement of sweep scanning over a limited arc, limit switches (not shown) within the slip ring box, when set by the operator, control the movement of the shaft accordingly.

Figure 6:
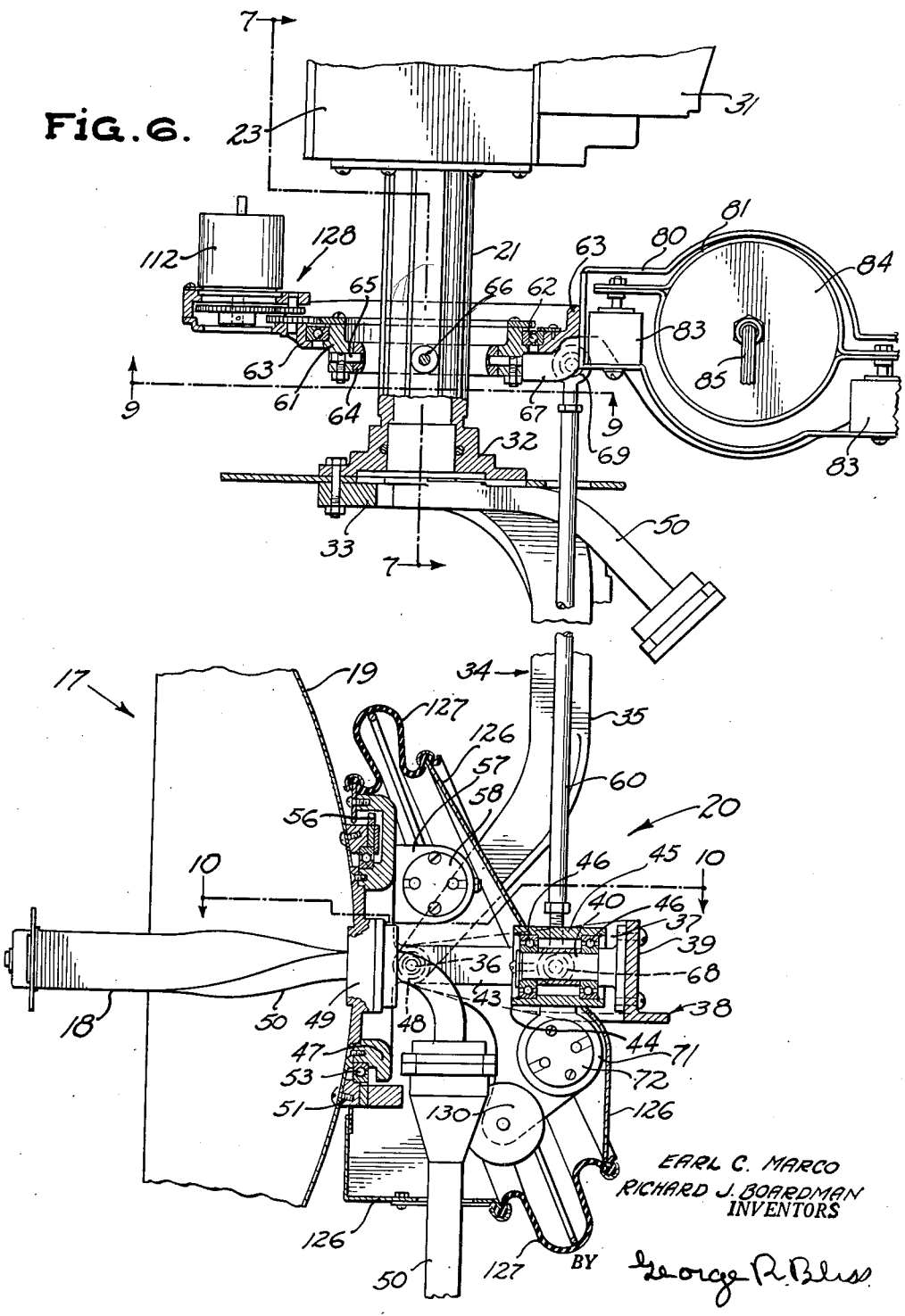
Figure 6 is a vertical sectional view taken as indicated by the line 6—6 of Figure 5.

To the expanded lower end 32 of the shaft 21 is bolted the cross arm 33 of a yoke 34 (see Figure 6). The side arms 35 of this yoke extend outwardly, downwardly and then forwardly to provide, with the axis in the plane of the shaft 21, a pair of pivotal connections 36 at their lower ends with the forward ends of the side arms 37 of a second yoke 38, having at its rear end a cross bar 39, the second yoke and its pivotal connections 36, lying in a normally horizontal plane.

Referring to Figures 6 and 10, a stub shaft 40 is rigidly bolted to the inner face of the cross bar 39, extending horizontally inwardly therefrom. A third yoke 41 has two forwardly extending arms 42 and 43 and a cross arm 44 with which is integrally formed a rearwardly extending drum 45. The drum surrounds the stub shaft 40, and ball bearings 46 at each end of the drum enable the drum and the yoke 41 which it carries to turn upon the stub shaft as an axis and at the same time to move up and down with the stub shaft as though they were rigidly connected to it, except for this turning movement.

To the forward ends of the arms 42 and 43 is pivoted at 52, 52 on an axis normally coincident with the axis of the pivotal connections 36, a vertically disposed ring 47 by means of a pair of diametrically opposite arms 48 formed as integral extensions of the ring. The ring has rigidly mounted upon it a hub 49 which carries the wave guide tube 50, and a radiator 18 at the outer end thereof. The reflector 19 is rotatably mounted on the ring 47 by means of a ring lug 51, screwed to the back of the reflector and of an annular ball bearing 53 disposed between the ring 47 and the ring lug 51.

The reflector is held in fixed angular position upon the ring 47 by means of gear train 54 carried by an extension 57 of the ring 47. A pinion gear 55 of this gear train meshes with a gear sector 56 on the ring lug 51. The shaft of this pinion gear 55 is driven by a motor 58 mounted on the extension 57. This motor is wired to the operator's room, and by manual control can be utilized to adjust the reflector on the hub 49 to place the spoiler 59 (Figure 5) in either a horizontal position for an equal energy beam or a vertical position for a pencil beam. Except for this optional adjustment the reflector and radiator are rotatively fixed relative to each other.

The axes 36 and 52 and 21 lie in a common plane. The virtual point X (Figure 11) at which the axes 36, 52 and the shaft axis 21 intersect each other is also in the axis of revolution $H^a$ of the radiator and reflector and the axis of revolution H of the drum 45. The axis $H^a$ may be tilted upwardly and downwardly about the point X with reference to the axis H over a limited range, as for instance an upward angle of 10 degrees, and a downward angle of 15 degrees by tilting the arms 48 and ring 47 on the axis 52 of pivotal connection with arms 42 by means of gear train 70 mounted on a frame extension 71 of the hub 45. The gear train 70 is driven by a motor 72 mounted on the frame extension 71 (Figures 10 and 12), the motor being wired to the operator's room and under his manual control. A pinion gear 73 of the gear train 70 meshes with an arcuate gear segment 74 on the sector arm 75 which is rigidly related to one of the arms 48. The operator may thus vary the tilt of the arms 48 with respect to the arms 42 about the axis 52, and give the reflector an angle of adjustment above or below the horizontal. Except for this manually controlled adjustability, the axis $H^a$ has a fixed relation to the axis H. Thus the beam during azimuth rotation, or when stationary in azimuth, will have a constant angle above or below the plane of the axes 52 and H.

The object of the stabilization as above stated is to maintain constant the angle of elevation of the beam above or below the horizontal plane. As the beam is perpendicular to the plane of the reflector rim, this plane of the reflector rim must be maintained at a constant angle to the true horizontal. If the beam is directed horizontally, axes H and $H^a$ will be coincident and their angle $h$ will be zero. Then by elevating or lowering the drum and with it the yokes 38 and 41, the reflector may be tilted back and forth on the horizontal axis 52 with respect to the yoke 34 and the aircraft.

If this tilting movement on the axis 52 is in degrees to compensate for the resultant tilting effect on the reflector about that axis with respect to the earth's horizontal plane of both pitch and roll of the aircraft about its longitudinal and transverse axes respectively at any given azimuth position of the antenna, the angle of tilt of the reflector to the horizontal about the axis 52 will remain zero. But, if yokes 38 and 41 were not free to relatively turn on the axis H, but were rigidly related, the reflector would at the same time be twisted about its axis by the resultant turning effect on the reflector, about that axis, of aircraft movements.

Now if, as is usually the case, the beam is directed above or below the true horizontal, by an adjustive operation of the motor 72 and gear train 70 to set the axis $H^a$ at an angle $h$ with the axis H, and if the yokes 38 and 41 were thus fixedly related to each other, and the axes 36 and 52 consequently could not assume an angular position relative to each other in that plane of the shaft axis 21 in which they both lie, then the reflector would be twisted on its axis $H^a$ by tilting movements of the plane, and as the axis $H^a$ is not horizontally coincident with the axis H but forms an angle therewith the beam will describe an arc of a circle about the axis H, and thereby undesirably change the angle of elevation of the beam from the true horizontal plane. It is accordingly necessary to pivotally mount the yoke 41 on the yoke 38, and to provide means for relatively twisting the two yokes, so that the yoke 41 and the reflector maintain a position of constant polarity with respect to the true horizontal to offset the resultant twisting effect on the reflector of the pitch and roll of the aircraft about its transverse and longitudinal axes respectively at any given azimuth position of the antenna.

To put it concisely, the supporting structure of the reflector and radiator, which in the design shown in the drawings are the yoke 41 and drum 45, is mounted on the aircraft so as to be capable of movements about a transverse tilting axis and a longitudinal axis of revolution, and means are provided for effecting these movements to the exact extent required to maintain the structure in a true horizontal plane. It is pointed out that the axis 52 need not be in that polar plane of the shaft axis 21 which also embraces the axis 36, provided only that the axis 52 passes through the point X and lies in the plane of the axes 36 and H when the longitudinal and transverse axes of the aircraft are both truly horizontal. Mechanical considerations and simplicity of construction make it preferable to place the axes 36 and 52 in the same polar plane about the shaft 21, which makes it possible to mount the reflector close to the point X and in compact horizontal adjacency to the supporting yokes. The means of twisting the arm 45 and changing its elevation to exactly compensate for the combined resultant effect of the roll of the aircraft about its longitudinal axes and of the tilt of the aircraft about its transverse axis respectively at each azimuth position, will next be considered.

The drum 45 is connected by two parallel links 60, 60 to a ring 61, which surrounds the shaft 21, and is rotatably mounted by an annular ball bearing 62 in a plate 63, which, in a manner to be presently explained, is kept terrestrially stable. This plate 63 does not rotate with the antenna shaft 21, but is held rotatively still by connections with the stationary antenna framework. These connections, however, permit it to tilt in any direction with respect to the frame 12 and the aircraft, as required to keep it parallel to the horizon. The ring 61, then, can turn with the antenna shaft. It and the plate 63 in which it rotates, can be tilted by suitable stabilizing mechanism with respect to the shaft axis 21 because it is mounted on the shaft by means of a gimbal ring 64 and two pairs of conventionally arranged gimbal trunnion pins 65 and 66, between the rings 61 and 64, and the ring 64 and the shaft 21 respectively. This gimbal ring mounting causes the ring 61 and the links 60, 60 to revolve in unison with the shaft 21.

The links 60, 60 each have a ball and socket universal joint connection 68 with opposite sides of the drum 45, the central points of these connections lying in the plane of the axis H and the axis 52. The upper ends of the links 60 have similar universal joint connections 69 with two arms 67 which extend laterally from the ring 61. The connections 69 are in the plane of the gimbal axes, are directly above the connections 68, and are equally spaced from the shaft axis 21, the spacing distance being the same as that of connections 68. These connecting links 60, 60 exactly reproduce any tilt of the plate 63 instantly in the plane of the yoke 41, both in direction and angular extent.

The plate 63 is rendered terrestrially horizontally stable by mechanism now to be described. At one end of the plate is fixedly secured a frame holder 80 in which is resiliently mounted a gyroscopic unit 84 of standard design (Figure 6). By means of circumferential bands 81, the unit is held firmly in the frame 80, but it is protected against vibratory shocks which might otherwise be received from the antenna assembly, by shock absorbers 83, 83. As this gyroscopic unit is of conventional design, it is not shown in detail in the drawings. It comprises a vertically disposed self erecting weighted motor, a gimbal ring mounting of the motor in the cylindrical case 84, and the two synchrotransmitters by which tilting of the motor axis generates electric voltage, the current of which is amplified and transmitted by suitable conductors in the cable 85 to corresponding synchromotors in two actuators 90 which operate as described below to bring the plate 63 back to a position of zero voltage in the synchromotors of the gyroscopic unit. Conductor cable 85 also carries the motor energizing wires for the gyroscopic unit motor which lead to the aircraft generating system.

Figures 7 and 8 show one of the two actuators 90 which are spaced 90° apart about the shaft 21, each operating a hollow longitudinally movable actuator rod 91 as shown in Figure 9. One of these actuator rods is mounted in a housing 92 (Figure 5) which is pivotally suspended on an axis 93 from an ear 94 formed on the adjacent side of the slip ring box 23. The other actuator is mounted in a housing 99 which is suspended from an extension 94a of the frame 12. The axis 93 is perpendicular to the radial line leading from the pivotal connection to the shaft 21. The housing 99 is suspended from a hanger 140 (Figure 4) on an axis 141 also perpendicular to a radial line leading to the shaft and this hanger is in turn pivotally mounted on the frame extension 94a on an axis 142 perpendicular to the axis 141, allowing universal swinging movement to the housing 99. The actuator rod 91 slides longitudinally within a bushing 95 in the lower end of the housing 92, and is longitudinally moved by a steep pitched worm rod 96 within it, which engages a cooperatively formed groove on the bore of the rod.

The worm rod 96 is driven by a synchromotor 97 through gearing 98, all suitably mounted in the housing 92. The synchromotor 97 is energized by amplified current from the corresponding synchrotransmitter of the gyroscopic unit flowing over conductors in the cable 101—85. The lower end of one rod 91 has a ball and socket connection 102 with an ear 103 on the plate 63, and of the other rod 91 with a suitable extension of the gyroscope holder 80, each connection 102 being directly beneath the associated actuator, and the two connections being therefore spaced at an angular distance of 90°. Each departure of the plate 63 from a terrestrial horizontal plane causes the actuators to restore the plate 63 to the horizontal through the instrumentality of the gyroscopic unit and the actuators which are controlled by it.

It will be noted that the actuator housing 92 is pivoted on an axis 93 which permits swinging movement of the associated rod 91 toward and away from the shaft 21, but constrains swinging movement of this rod about the shaft tangentially to its circular path of revolution. The other housing 99 is pivotally mounted to swing both toward and away from the shaft, and tangentially to its circular path of revolution. As a result of this arrangement, the plate 63 is held stationary with the frame structure 12 against azimuth rotation, but is free to tilt with respect to the shaft axis by virtue of the extensible character of the rods 91.

While either of the housings 92 and 99 may be thus pivoted to swing in one direction only, to and from the shaft, and the other pivoted to swing universally, if the housing 99 is pivoted to swing on a single axis, which is parallel to the longitudinal axis of the aircraft, the plate 63 is held against any azimuth shift with respect to the direction of flight, without regard to roll and pitch of the aircraft, and any change of azimuth position of the target image on the scope, will be in exact accord with any azimuth change of direction of the aircraft (i. e., any azimuth shift of its longitudinal axis), or with the azimuth movement of the target, as the case may be. If the single swing axis is parallel to the transverse axis of the aircraft, there will result a relative azimuth shift of the plate 63 from the longitudinal axis of the aircraft due to roll and pitch of the aircraft.

Since the plate 63 is thus in an exactly correct azimuth position at all times with respect to the longitudinal axis of the aircraft, the synchrotransmitter 112 which controls the azimuth travel of the sweep on the scope is mounted on the plate 63 (Figure 6) and driven by a gear train 128 so mounted on the plate 63 and the ring 61 that the exact azimuth position at any moment of the antenna with reference to the longitudinal axis of the aircraft is reproduced in the position of the sweep on the indicator scope.

For mechanical reasons, the axis of the gimbal pins 65 between the stabilized ring 61 and intermediate gimbal ring 64 must be parallel to the axis H of the reflector mounting yoke 42. When, as the reflector is usually mounted, the vertical plane of the reflector beam embraces the axis H, these axes 65 and H maintain the same azimuth angle with the longitudinal axis of the aircraft, as does the reflector beam, which, because of the above specified mounting of the actuator rod housings, appears on the scope as the true azimuth angle of the sweep without error due to roll and pitch.

The invention is applicable to any instrument comprising a device for sending an energy beam laterally outwardly from the instrument at a constant angle of elevation with respect to a horizontal plane and a mount for the sending device, the mount being subjected to tilting movements with respect to the horizontal, to relative rotation in azimuth with respect to the sending device, and particularly to such an instrument in which the device sends an energy beam laterally outwardly at a constant angle of elevation and cyclically moves the beam in azimuth about the mount. In the embodiment of the invention herein disclosed, the instrument is a scanning radar set adapted for mounting on an aircraft. The beam, if stationarily directed, is kept at constant elevation and constant azimuth position with respect to the longitudinal axis of the aircraft. The beam, if moving in azimuth, is kept at constant elevation and at the same azimuth angle as the longitudinal axis of the aircraft. An instrument constructed in accordance with the invention is also of advantage in that it holds constant the polarity of the beam, which may be a desirable or required condition of the use of the instrument.

While, therefore, the specific details of the radar set which have been here described to assist in an understanding of the nature of the invention, are not important, the following supplementary features are mentioned. The outer end portion 50 of the wave guide leads from the hollow hub 49 (Fig. 6) in a rectangular tube downwardly, outwardly and upwardly to the lower end of the cylindrically hollow shaft 21 (Figure 1). This tube is flexible to allow for relative movement of the reflector and its support. At the upper end of the shaft the stationary inner end portion 111 of the wave guide, which is again rectangular in section, leads to the electronic equipment for generating the outgoing wave energy and converting the incoming wave energy to the signals on the scope. The conductor cable 125 (Figure 1) attached to the wave guide 50, carries the current for the antenna head, the current for the reflector adjusting motors 58 and 72.

Since the antenna head and the yoke 41 have relative movement, and enclose moving parts, a dust protector 126 having a bellows like flexible connection 127 between its front and rear walls is provided. The electrical circuits, provided for the proper operation of the radar set, are known to those familiar with the radar instrument art and any detailed reference to the conductors and their connections and functions is here omitted.

An analysis of the mechanical elements of the radar equipment described and shown herein reveals that they may be grouped in two assemblies, one assembly stationary with respect to the aircraft as far as azimuth rotation is concerned, and one assembly mounted on this stationary assembly for such azimuth rotation. The stationary assembly comprises the main casing frame 12, the motor 30 and the motor transmission 31 for driving the rotating assembly in azimuth, the slip ring box 23, the inner end 111 of the wave guide, the stabilized plate 63 and the associated gyroscopic unit 84 and actuators 90, the azimuth synchrotransmitter 112, and the conductors and electrical devices for energizing these stationary elements and the stationary ends of the electrical conductors leading to devices on the rotating assembly. The assembly which rotates in azimuth comprises the shaft 21, the antenna radiator and reflector, the frame structure 20 suspended from the lower end of the shaft 21, upon which the antenna radiator and reflector are mounted for universal tilting movement, and upon which are also mounted the motor mechanisms for operator control of the nod angle $h$ and the polarity of the reflector, and further comprises the ring 61, gimbal ring 64, the links 60, the outer end portion 50 of the wave guide, and the electrical conductors leading to the adjusting motors 58 and 72, and the signaling potentiometer 130 (Figure 6) of the sector 75 driven by the pinion gear 131 (Figure 12). The terminals of the stationary conductors leading to the rotating assembly make contact with the terminals of the conductors mounted on the rotating assembly in the slip ring box. The stationary and revolving portions of the wave guide are connected by a rotary joint 120, at the upper end of the hollow shaft 21. The ring 61 has a rotating connection with the stationary stabilizing elements at the annular bearing 62.

The stabilized plate 63, while it does not rotate with the above described rotating assembly, tilts at angles in all directions to the shaft 21, by virtue of the gimbal ring connection between it and the shaft, the tilting being effected by the gyroscopic unit 84 and actuators 90. The ring 61, while it rotates with the rotating assembly tilts in unison with the non-rotating stabilized plate 63. The stabilized but rotating ring 61 lies in a plane, with which is held parallel at all times by the links 60, the plane of the antenna carrying yoke 41 because three points fixedly related to the ring 61, defining a fixed triangle, are connected by three links respectively (two actual and one virtual) with three points in a triangle of similar shape and equal size which are fixedly related to the yoke 41, two corresponding points of the two triangles being in the axis of the shaft 21, and the other two pair of corresponding points of the two triangles being equally angularly spaced in the same polar positions about the shaft 21. The three upper points are the intersection of the shaft axis with the plane of the ring 61 at which there is a virtual universal gimbal ring joint between the shaft and ring 61, and the pivot points of the two universal joints 69 at the upper ends of the links 60, respectively. The three lower points are the point X in the shaft axis in the plane of the yoke 41, providing a virtual universal joint between the shaft and the yoke 41, and the pivot points of the two universal joints 68 at the lower ends of the links 60. The two links 60 are always parallel to each other and to the shaft 21, which, with its virtual extension to the point X, constitutes the third parallel link. The arrangement is such that the two links 60 both tilt the reflector about its transverse diametric axis and maintain that axis parallel to the true horizontal plane in exact compensation for tilting of the aircraft about any axis lying in the plane of its transverse and longitudinal axes.

We claim:

1. In a radar antenna equipment for a movable vehicle, the combination of: an assembly mounted stationarily on the vehicle; an assembly mounted to rotate on an axis, upright with respect to the longitudinal and transverse axes of the vehicle; means for effecting said rotation; a support mounted on said rotating assembly for rotation therewith and for fully universal tilting movement about a first point longitudinally fixed on the said upright axis; means mounted on said support for forming and directing an energy beam laterally outwardly from said support in a fixed azimuth direction with reference to said support; a terrestrially stabilized element mounted for fully universal tilting movement about a second point longitudinally fixed on said upright axis and for rotation in unison with said rotating assembly about said second fixed point as a center; and a pair of links, each of the same effective length as the distance between said two fixed points and arranged parallel to said upright axis, and having universal connections at their corresponding one ends to said stabilized element, and at their corresponding other ends to said support, the fixed point and link connections at each end being arranged in triangles of the same size and shape and in the same polar position about said upright axis, said triangles lying in parallel planes, the one triangle lying in the stabilized horizontal plane of said stabilized element, said support comprising two frame pieces, a first one of which is pivotally mounted on the rotating assembly on a transverse axis passing through the first fixed point and perpendicular to the upright axis and to the direction line of the beam, and the second one of which is pivotally mounted on the first frame piece on a second axis perpendicular to the transverse axis and also passing through said first fixed point, and said two lengths being connected at their said other ends to said second frame piece at points equidistant from and in the plane of said second axis.

2. The combination defined in claim 1, in which the beam forming and directing means is pivotally mounted on the second frame piece on a horizontal axis perpendicular to the directional axis of the beam, and in addition thereto, means under the control of the operator for tilting the beam forming and directing means to move its directional axis in a vertical plane about said horizontal axis.

3. The combination defined in claim 2, in which the said horizontal axis lies in the same vertical polar plane of the upright axis as the said transverse axis, and the said horizontal axis and the directional axis both pass through said first fixed point.

4. The combination defined in claim 1, in which the said terrestrially stabilized element is a ring connected to said rotating assembly for universal tilting movement about said second fixed point by an intermediate gimbal ring, the gimbal axis between said rotating assembly and intermediate ring being parallel to said transverse axis.

5. The combination defined in claim 4 in which the stabilizing means comprises: a stabilized laterally extending member on which said stabilized ring is rotatably mounted for rotation about said second fixed point as a center; a first actuator hinged to the stationary assembly at a point offset from the said upright axis on an axis parallel to the longitudinal axis of the aircraft with its axially travelling reciprocating thrust rod generally parallel to the upright axis and connected at its outer end by a first universal joint with said member; a second actuator hinged to the stationary assembly at a similarly offset point angularly spaced 90° around the upright axis from the first offset point, the hinge structure being characterized by two perpendicularly related axes for universal swinging movement of the actuator, with its axially travelling reciprocating thrust rod generally parallel to the upright axis and connected at its outer end by a universal joint with said member at a point spaced angularly 90° from said first universal joint; and a gyroscopically controlled servomotor means for actuating said rods responsive to aberrations of the vehicle from the horizontal to horizontally stabilize the said stabilized member and ring element.

6. The combination defined in claim 5, in which the gyroscopically controlled servomotor means comprises: a vertical self-erecting gyroscope mounted on the stabilized member; and a servomotor set on the said gyroscope and actuators for operating said actuator rods.

7. In a radar antenna equipment for aircraft, the combination of: a stationarily mounted frame subject to tilting movements of the aircraft with respect to a horizontal plane; an assembly mounted on the stationary frame for rotation about an axis upright with respect to the longitudinal and transverse axes of the aircraft; a supporting structure mounted on the rotating assembly for rotation therewith comprising two elements, a first of which is pivoted to the rotating structure for rotation about a first transverse axis perpendicularly intersecting the upright axis at a first point longitudinally fixed on said upright axis and the second of which is pivoted to said first element on a second transverse axis perpendicularly intersecting said transverse axis at said fixed point; a beam forming and directing means mounted on the said second element; a stabilized structure comprising two elements relatively rotatably related to each other in a common plane about a second point longitudinally fixed on the said upright axis, the first element of which is mounted on the rotating assembly by means of a gimbal ring connecting means, the intermediate ring of which is pivoted to the rotating structure on an axis parallel to said first transverse axis, and intersecting said upright axis at said second fixed point, and the second element of which is connected to the stationary frame by a pair of extensible links arranged generally parallel to the upright axis, the said links having universal joints with said second element, at two points, respectively, angularly spaced 90° about the upright axis, the first of said links being hinged to the stationary frame on an axis perpendicular to a radial line to the upright axis, and the other of said links being hinged to the stationary frame by a hinge device allowing universal swinging of the link; means for varying the length of said links in response to tilting movements of the aircraft for maintaining the stabilized structure horizontal; and means connecting the rotating element of the stabilized structure with the said supporting structure for maintaining the plane of the stabilized structure embracing the said common plane and second fixed point, parallel with the plane of the supporting structure embracing the said two perpendicularly related pivotal axes of said supporting structure.

8. The combination defined in claim 7, in which the beam forming and directing means is pivotally mounted on said second support element with its directional and pivotal axes intersecting and perpendicular to said second transverse axis at said first fixed point, and with its pivotal axis in the polar plane of the upright axis and the first transverse axis; and in addition thereto means under the control of the operator for varying the angle between the said pivotal and directional axes; and in which the said second transverse axis is parallel to the axis between the intermediate gimbal ring and the first element of the stabilized structure and to the hinge axis of the first of said links to the stationary structure.

9. The combination defined in claim 8, and in addition thereto: a synchrotransmitter mounted on the second element for electrical connection to the scope beam deflecting means; and gearing mounted on said first and second elements of said stabilized structure for driving said synchrotransmitter at a speed proportional to the relative rotational speed of the said first and second elements.

10. The combination defined in claim 9, in which the hinge axis of the first of said links is parallel to the longitudinal axis of the aircraft.

11. The combination defined in claim 8, in which the link-length-varying means comprises: a vertical, self-erecting gyroscope on the second element of the stabilized structure; a synchrotransmitter on said second element actuated by the relative movements of said gyroscope; and two synchromotors operatively connected to said synchrotransmitter and mounted on the stationary structure for varying the length of said links, respectively.

12. The combination defined in claim 8 in which the hinge axis of the first of said links is parallel to the longitudinal axis of the aircraft.

13. The combination defined in claim 7, in which said stationary frame includes a casing; in which said rotating assembly includes a hollow shaft revolvably mounted within the casing on the upright axis; in which a yoke is secured to one end of said shaft, in position to project beyond the casing, to which yoke is pivoted on the first transverse axis, the first element of the supporting structure; in which a flexible wave guide tube connects the beam forming and directing means with the said end of the shaft; in which a stationary end portion of the wave guide is connected to the open other end of the hollow shaft by a rotary joint; and in which the said second fixed point is positioned along said shaft intermediately of its ends, and said extensible links are positioned between the said stabilized structure and the said other end of the shaft.

14. In a radar antenna equipment for aircraft, the combination of: a stationarily mounted frame subject to tilting movements of the aircraft with respect to a horizontal plane; an assembly mounted on the stationary frame for rotation about an axis upright with respect to the longitudinal and transverse axes of the aircraft; a supporting structure mounted on the rotating assembly for rotation therewith and for universal tilting movement about two perpendicularly related axes passing through a first point longitudinally fixed on said upright axis; a beam forming and directing means mounted on the supporting structure; a stabilized structure comprising two elements relatively rotatably related to each other in a common plane about a second point longitudinally fixed on said upright axis, said plane embracing said point, a first element of which stabilized structure is mounted on the rotating assembly for rotation therewith by means of a gimbal ring connecting means, the gimbal axes of which pass through said second fixed point, and a second element of which is connected to the stationary frame by connecting means holding it rotatively stationary with respect thereto and permitting it and the second element as they relatively rotate in said common plane to universally tilt about said second fixed point; means for adjusting said connecting means of the second element of the stabilized structure to terrestrially stabilize the common plane of relative rotation of said first and second elements; a synchrotransmitter mounted on the second element for electrical connection to the scope deflecting means; gearing mounted on said first and second elements for driving said synchrotransmitter at a speed proportional to the relative rotational speed of the first and second elements; and means connecting the rotating element of the stabilized structure with the said supporting structure for maintaining said common plane of the stabilized elements parallel with that plane of the supporting structure which embraces the said perpendicularly related axes.

15. In a radar antenna equipment for aircraft, the combination of: a stationarily mounted frame subject to tilting movements of the aircraft with respect to a horizontal plane; an assembly mounted on the stationary frame for rotation about an axis upright with respect to the longitudinal and transverse axes of the aircraft; a supporting structure mounted on the rotating assembly for rotation therewith and for universal tilting movement about two perpendicularly related axes passing through a first point longitudinally fixed on said upright axis; a beam forming and directing means mounted on the supporting structure; a stabilized structure comprising two elements relatively rotatably related to each other in a common plane about a second point longitudinally fixed on said upright axis, said plane embracing said point, a first element of which stabilized structure is mounted on the rotating assembly for rotation therewith by means of a connecting structure providing a universal tilting movement of the first element about axes which pass through said second fixed point, and a second element of which is connected to the stationary frame by connecting means holding it rotatively stationary with respect thereto and permitting it and the first element as they relatively rotate in said common plane to universally tilt about said second fixed point; means for adjusting said connecting means of the second element of the stabilized structure to terrestrially stabilize the common plane of relative rotation of said first and second elements; a synchrotransmitter mounted on the second element for electrical connection to the scope beam deflecting means; gearing mounted on said first and second elements for driving said synchrotransmitter at a speed proportional to the relative rotational speed of the first and second elements; and means connecting the rotating element of the stabilized structure to said supporting structure for maintaining the said common plane of the stabilized structure parallel with that plane of the supporting structure which embraces the said perpendicularly related axes.

16. In a radar antenna equipment for aircraft, the combination of: a stationarily mounted frame subject to tilting movements of the aircraft with respect to a horizontal plane; an assembly mounted on the stationary frame for rotation about an axis upright with respect to the longitudinal and transverse axes of the aircraft; a supporting structure mounted on the rotating assembly for rotation therewith and for universal tilting movement about two perpendicularly related axes passing through a first point longitudinally on said upright axis; a beam forming and directing means mounted on the supporting structure; a stabilized structure comprising two elements relatively rotatably related to each other in a common plane about a second point longitudinally fixed on said upright axis, said plane embracing said point, a first element of which stabilized structure is mounted on the rotating assembly for rotation therewith by means of a gimbal ring connecting means, the gimbal axes of which pass through said second fixed point, and a second element of which is connected to the stationary frame by connecting means holding it rotatively stationary with respect thereto and permitting it and the second element as they relatively rotate in said common plane to universally tilt about said second fixed point; means for adjusting said connecting means of the second element of the stabilized structure to terrestrially stabilize the common plane of relative rotation of said first and second elements, said means comprising an actuating means for moving said connecting means, a gyroscope mounted on said second element, and a servomotor means connecting said gyroscope to said actuating means; means connecting the rotating element of the stabilized structure to said supporting structure for maintaining the said common plane of the stabilized structure parallel with that plane of the supporting structure which embraces the said perpendicularly related axes; a synchro-transmitter mounted on the second element for electrical connection scope beam deflecting means; and gearing mounted on said first and second elements for driving said synchro-transmitter at a speed proportional to the relative rotational speed of the first and second elements.

17. In a radar antenna equipment for a movable vehicle, the combination of: a support adapted to be mounted in a fixed position on said vehicle to define a normally upright axis perpendicular to the normally horizontal longitudinal and transverse axes of said vehicle; a terrestrially stabilized element carried by said support defining a horizontal plane intersecting said upright axis at a given fixed point; means mounting said element for rotation in said horizontal plane about said given fixed point as a center; universal means mounting said element on said support for fully universal tilting movement of said upright axis relative to said horizontal plane about said given fixed point; a first frame also carried by said support; means mounting said first frame for pivotal movement about a transverse axis intersecting said upright axis at a second point spaced a fixed distance from said given point; means mounting said first frame for rotation in unison with the rotation of said element; a second frame; means mounting said second frame on said first frame for pivotal movement about a longitudinal axis perpendicular to both said transverse axis and said upright axis and passing through said second point; beam forming means on said second frame in a fixed azimuth position with respect thereto for directing an energy beam outwardly at right angles to said transverse axis; a pair of links, each having an effective length equal to the spacing of said given and second points; universal connections connecting corresponding ends of said links to said element at spaced locations in said horizontal plane both spaced from said given point;

and universal connections connecting the corresponding other ends of said links to said second frame at spaced locations both spaced from said second point, the two triangles defined by each of said points and the two locations respectively associated therewith being congruent and occupying identical azimuth positions.

18. The combination defined in claim 17 in which said terrestrially stabilized element comprises a ring; and in which said universal means comprises an intermediate ring, means mounting said intermediate ring for pivotal movement about a longitudinal axis passing through said given point, and pivot means interconnecting said ring and said intermediate ring for relative pivotal movement about a transverse axis parallel to the transverse pivot axis of said first frame.

References Cited in the file of this patent

UNITED STATES PATENTS

| Number | Name | Date |
|---|---|---|
| 2,475,746 | Kenyon | July 12, 1949 |
| 2,551,180 | Starr et al. | May 1, 1951 |